United States Patent
Mejri et al.

(10) Patent No.: US 10,560,222 B2
(45) Date of Patent: Feb. 11, 2020

(54) METHODS AND DEVICES FOR SUB-BLOCK DECODING DATA SIGNALS

(71) Applicant: INSTITUT MINES-TELECOM, Paris (FR)

(72) Inventors: Asma Mejri, Antibes (FR); Ghaya Rekaya Ben-Othman, Antony (FR); Mohamed-Achraf Khsiba, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/844,734

(22) Filed: Dec. 18, 2017

(65) Prior Publication Data
US 2018/0175972 A1 Jun. 21, 2018

(30) Foreign Application Priority Data

Dec. 21, 2016 (EP) .................................... 16306758

(51) Int. Cl.
*H04L 1/06* (2006.01)
*H04B 7/0417* (2017.01)
(Continued)

(52) U.S. Cl.
CPC ......... *H04L 1/0643* (2013.01); *H04B 7/0417* (2013.01); *H04B 7/0891* (2013.01);
(Continued)

(58) Field of Classification Search
CPC ... H04B 7/0413; H04B 7/0697; H04L 1/0031; H04L 25/0244; H04L 25/03006;
(Continued)

(56) References Cited

U.S. PATENT DOCUMENTS

2009/0154604 A1 * 6/2009 Lee et al.
2010/0042666 A1 2/2010 Park et al.
2016/0134344 A1 * 5/2016 Patel et al.

OTHER PUBLICATIONS

European Search Report for 16306758.0 dated May 2, 2017.
W-J Choi, et al: "Combined ML and DFE decoding for the V-BLAST system", IEEE International Conference on Communications, vol. 3, pp. 1243-1248, 2000.
T. P. Ren, et al: "Fast-group-decodable space-time block code", In Proceedings of IEEE Information Theory Workshop, pp. 1-5, Jan. 2010.

(Continued)

*Primary Examiner* — Marsha D Banks Harold
*Assistant Examiner* — Dharmesh J Patel
(74) *Attorney, Agent, or Firm* — Meagher Emanuel Laks Goldberg & Liao, LLP

(57) ABSTRACT

Embodiments of the invention provide a decoder for decoding a signal received through a transmission channel in a communication system, said signal comprising a vector of information symbols, said transmission channel being represented by an upper triangular matrix, wherein the decoder comprises:
  a processing unit (309) configured to determine a set of division parameters depending on at least one division metric derived from components of said upper triangular matrix;
  a decoding unit (311) configured to divide said upper triangular matrix into two or more sub-matrices using said set of division parameters in accordance with a division of said vector of information symbols into two or more sub-vectors, and to determine at least one estimate of each sub-vector of information symbols by applying a symbol estimation algorithm,
wherein the decoder is configured to determine at least one estimate of said vector of information symbols from the estimates of said sub-vectors of information symbols.

15 Claims, 5 Drawing Sheets

(51) Int. Cl.
*H04L 25/02* (2006.01)
*H04L 25/03* (2006.01)
*H04B 7/08* (2006.01)
*H04L 1/00* (2006.01)

(52) U.S. Cl.
CPC .... *H04L 25/0242* (2013.01); *H04L 25/03191* (2013.01); *H04L 25/03961* (2013.01); *H04L 1/0054* (2013.01); *H04L 1/0631* (2013.01)

(58) Field of Classification Search
CPC ......... H04L 25/03159; H04L 25/03343; H04L 25/03821; H04L 27/2649; H04L 1/0643; H04L 2025/03605; H04W 84/042; H04W 84/12
See application file for complete search history.

(56) References Cited

OTHER PUBLICATIONS

Srinath et al., "Low ML-Decoding Complexity, Large Coding Gain, Full-Rate, Full-Diversity STBCs for 2×2 and 4×2 MIMO Systems", IEEE Journal of Selected Topics in Signal Processing, Dec. 2009, vol. 3, No. 6, pp. 316-927.

Natarajan et al., "On the Sphere Decoding Complexity of High-Rate Multigroup Decodable STBCs in Asymmetric MIMO Systems", IEEE Transactions on Information Theory, Sep. 2013, vol. 59, No. 9, pp. 5959-5965.

* cited by examiner

METHODS AND DEVICES FOR SUB-BLOCK DECODING DATA SIGNALS

TECHNICAL FIELD

The invention generally relates to digital communication and in particular to methods and devices for decoding a data signal.

BACKGROUND

Multiple-Input Multiple-Output (MIMO) technologies are used in several communication systems to provide high transmission rates. MIMO technologies exploit the space and time dimensions to encode and multiplex more data symbols using a multiplicity of transmit and/or receive antennas, over a plurality of time slots. As a result, the capacity, range, and reliability of a MIMO-based communication system can be enhanced. Exemplary MIMO communication systems comprise wired, optical and wireless communication systems.

MIMO systems are based on Space-Time coding and decoding techniques. At transmitter devices, Space-Time encoders are implemented to encode data streams into codewords transmitted thereafter through the transmission channel. At the receiver side, Space-Time decoders are implemented to recover intended data streams conveyed by the transmitter device(s).

Given the channel output and a channel matrix representative of the transmission channel, a Space-Time decoder attempts to determine an estimate of the sequence of information symbols sent by one or more transmitters. A decoding algorithm may be implemented for this purpose. The choice of the decoding algorithm to be used may depend on the target performance and the implementation complexity and cost.

A first category of Space-Time decoders comprises decoding algorithms that provide optimal performances in terms of transmission rates and decoding error rates. In the presence of equally distributed information symbols, optimal Space-Time decoders implement the Maximum Likelihood (ML) decoding criterion. The estimated sequence of information symbols in this case has the minimum Euclidean distance with respect to the received signal. Exemplary ML decoding algorithms comprise the exhaustive search and sequential decoding algorithms such as the Sphere decoder, the Schnorr-Euchner decoder, the Stack decoder, and the SB-Stack decoder. ML decoders provide optimal performances but require a high computational complexity that increases with the number of antennas and the size of the alphabet to which the information symbols belong.

A second category comprises sub-optimal decoding algorithms that can be categorized into two classes depending on whether the information symbols are decoded individually or by sub-blocks of vectors (i.e. by sub-vectors).

Exemplary algorithms based on decoding symbols individually (referred to 'single-symbol' decoding algorithms) comprise linear decoders, such as the Zero-Forcing (ZF) and the Minimum Mean Square Error (MMSE) decoders, and non-linear decoders such as the Zero-Forcing Decision Feedback Equalizer (ZF-DFE). Linear and non-linear decoders require lower computational complexity compared to ML decoders. However, they provide limited performance.

Algorithms implementing sub-block decoding are based on a division of the vector of information symbols into two or more sub-vectors. Each sub-vector is estimated individually and recursively given the previously estimated sub-vectors of symbols. The estimation of each sub-vector of symbols is performed using a symbol estimation algorithm. Any sequential, linear or non-linear decoding algorithm may be implemented in a given sub-block as a symbol estimation algorithm to generate the estimate of the corresponding sub-vector of information symbols.

According to QR-based sub-block decoding algorithms (referred to as 'recursive sub-block decoding'), the division of the vector of information symbols is made in accordance with a division of an upper triangular matrix representative of the transmission channel. The upper triangular matrix can be obtained by applying a QR decomposition to a channel matrix representative of the transmission channel.

A QR-based sub-block decoding algorithm is disclosed in "W-J Choi, R. Negi, and J. M. Cioffi, Combined ML and DFE decoding for the V-BLAST system, IEEE International Conference on Communications, Volume 3, pages 1243-1248, 2000". A combination of ML and DFE decoding is therein proposed for wireless MIMO systems using spatial multiplexing of data streams. The vector of information symbols of length n is first divided into two sub-vectors of lengths p and n−p respectively. ML decoding is then used to determine an estimation of the sub-vector comprising p information symbols. Then, using decision feedback equalization, the remaining n−p symbols are estimated after an inter-symbol interference cancellation. The choice of the division parameters, i.e. the number of sub-vectors and the length of each sub-vector, is deterministic.

Other QR-based sub-block decoding algorithms for coded wireless MIMO systems are disclosed for example in:

"K. Pavan Srinath and B. Sundar Rajan, Low ML-Decoding Complexity, Large Coding Gain, Full-Rate, Full-Diversity STBCs for 2×2 and 4×2 MIMO Systems, IEEE Journal of Selected Topics in Signal Processing, Volume 3, Issue 6, pages 916-927, 2009";

"L. P. Natarajan, K. P. Srinath, and B. Sundar Rajan, On The Sphere Decoding Complexity of Gigh-Rate Multigroup Decodable STBCs in Asymmetric MIMO Systems, IEEE Transactions on Information Theory, Volume 59, Issue 9, 2013"; and "T. P. Ren, Y. L. Guan, C. Yuen, and R. J. Shen. Fast-group-decodable space-time block code. In Proceedings of IEEE Information Theory Workshop, pages 1-5, January 2010".

The division of the upper triangular matrix in these works depends on the used Space-Time Block Code (STBC) and in particular to the class to which a STBC may belong.

Existing recursive sub-block decoding algorithms provide better performances than linear and non-linear decoders. However, the division of the vector of information symbols is performed either deterministically or depending on the used code in coded systems. Thus, existing sub-block division criteria are not sufficiently adapted to any spatial multiplexing or coded MIMO system and can result in a sub-optimal performance/complexity tradeoff. There is accordingly a need for sub-block division techniques adapted to any MIMO configuration and enabling an optimization of the sub-block decoding performance/complexity tradeoffs.

SUMMARY

In order to address these and other problems, there is provided a decoder for decoding a signal received through a transmission channel in a communication system. The signal comprises a vector of information symbols. The transmission channel is represented by an upper triangular matrix. The decoder comprises:
- a processing unit configured to determine a set of division parameters depending on at least one division metric derived from components of the upper triangular matrix;
- a decoding unit configured to divide the upper triangular matrix into two or more sub-matrices using the set of division parameters in accordance with a division of the vector of information symbols into two or more sub-vectors, and to determine at least one estimate of each sub-vector of information symbols by applying a symbol estimation algorithm.

The decoder is configured to determine at least one estimate of the vector of information symbols from the estimates of the sub-vectors of information symbols.

In some embodiments, the set of division parameters may comprise at least one division parameter chosen in a group consisting of a number of the two or more sub-matrices and a number of rows comprised in each sub-matrix from the two or more sub-matrices.

In some embodiments, the at least one division metric may be a function of a number of components being greater than or equal to a value, the value being a real number.

In one embodiment, the value may be equal to zero.

According to some embodiments, each component of the upper triangular matrix may be represented by a first value and a second value, the first value defining a row index and the second value defining a column index. In such embodiment, the at least one division metric may be a function of the first integer value and/or the second integer value representing at least some components of the upper triangular matrix.

In some embodiments, the at least one division metric may be a conditioning number.

In some embodiments, the decoder may further comprise a storage unit configured to store one or more symbol estimation algorithms. In such embodiments, the decoding unit may be configured to select the symbol estimation algorithm from the one or more symbol estimation algorithms.

According to some embodiments, the processing unit may be configured to iteratively determine a current set of division parameters, the current set of division parameters providing a number of current sub-matrices, the processing unit being configured to determine the at least one division metric from the components of the current sub-matrices and to update the current set of division parameters in response to a division criterion related to the at least one division metric, the set of division parameters being determined from at least one current set of division parameters.

According to some embodiments, the processing unit may be configured to determine an initial set of division parameters depending on the one or more symbol estimation algorithms and to determine at least one current set of division parameters from the initial set of division parameters.

In a particular embodiment, the decoder may be further configured to previously determine the one or more symbol estimation algorithms depending on a signal-to-noise ratio and/or on a value of an outage capacity of the transmission channel and/or on a value of a transmission rate.

In some embodiments, the division criterion may be based on the optimization of the at least one division metric.

Still in some embodiments, the division criterion may depend on the value of the at least one division metric with respect to one or more division metric thresholds.

In one embodiment, the one or more division metric thresholds may depend on a standard deviation of a noise affecting the transmission channel and/or on the first value defining at least some components of the upper triangular matrix.

According to some embodiments, the communication system may be a cryptographic communication system, the signal being encoded using at least one cryptographic secret value.

There is also provided a method for decoding a signal received through a transmission channel in a communication system. The signal comprises a vector of information symbols. The transmission channel is represented by an upper triangular matrix. The method comprises:
- determining a set of division parameters depending on at least one division metric derived from components of the upper triangular matrix;
- dividing the upper triangular matrix into two or more sub-matrices using the set of division parameters in accordance with a division of the vector of information symbols into two or more sub-vectors, and determining at least one estimate of each sub-vector of information symbols by applying a symbol estimation algorithm.

The method further comprises determining at least one estimate of the vector of information symbols from the estimates of the sub-vectors of information symbols.

Advantageously, the various embodiments provide sub-block division techniques allowing adapting the division of the vector of information symbols to the implemented symbol estimation algorithms and enabling a reduction of the computational complexity of the sub-block decoding process as well as a decoding error performance improvement.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention and, wherein.

DETAILED DESCRIPTION

Embodiments of the present invention provide devices, methods, and computer program products for sub-block decoding a vector of information symbols received through a transmission channel in a communication system with an optimized tradeoff between the decoding performances and the decoding computational complexity. The transmission channel is represented by an upper triangular matrix R obtained by applying a QR decomposition to a channel matrix representative of the transmission channel.

Embodiments of the present invention provide an optimized division of the upper triangular matrix according to a division criterion, the division criterion enabling a reduction of the complexity of the symbol estimation algorithm implemented for determining at least one estimate of each sub-vector of information symbol.

Devices, methods, and computer program products according to the various embodiments may be implemented in different types of systems. In particular, devices, methods, and computer program products according to the various embodiments may be implemented in communication systems to determine an estimate of a vector of information symbols conveyed from one or many transmitter devices to a receiver device.

The following description of some embodiments will be made with reference to communication systems, for illustration purpose only. However, the skilled person will readily understand that the various embodiments may be applied in other types of systems such as signal processing systems, cryptographic systems, and positioning systems.

Figure 1:
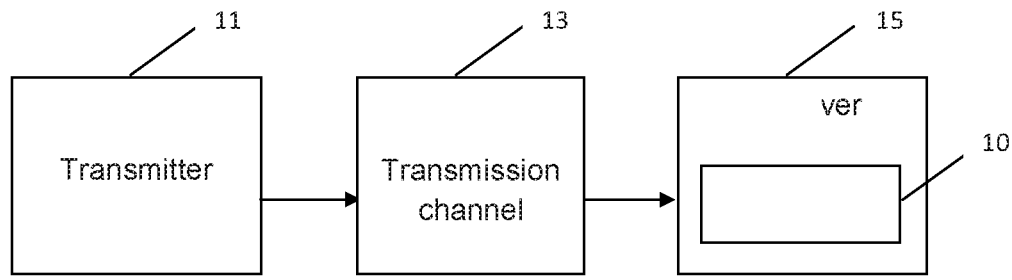
FIG. 1 is a block diagram of an exemplary application of the invention to communication systems, according to some embodiments.

FIG. 1 is a block diagram of an exemplary application to a communication system 100, according to some embodiments. The communication system 100 may be wired, wireless, or optical fiber-based. The communication system 100 may comprise at least one transmitter device 11 (hereinafter referred to as a "transmitter") configured to transmit a plurality of information symbols to at least one receiver device 15 (hereinafter referred to as "receiver") through a transmission channel 13. The receiver 15 may include at least one decoder 10 to decode the information symbols sent by one or more transmitter devices 11. The transmission channel 13 may be any wired connection, any wireless medium, or optical fiber-based link.

In an application of the invention to wired communication systems such as computer networking systems, the transmitter device 11 and/or receiver device 15 may be any device configured to operate in a wired network. Exemplary devices in such applications comprise computers, routers or switches connected to a small or large area wired network. The transmission channel 13 may be in this case any type of physical cable used to ensure the transfer of data between the different connected devices.

In one application of the invention to radio communication systems, the communication system 100 may be a wireless single-user MIMO system comprising a wireless transmitter device 11 configured to communicate a flow of information symbols representing an input data and a wireless receiver device 15, configured to decode the conveyed symbols by the transmitter 11.

The transmitter device 11 may be equipped with one or more transmit antennas and the receiver device 15 may be equipped with one or more receive antennas.

In another application of the invention to radio communication systems, the communication system 100 may be a wireless multi-user MIMO system in which a plurality of wireless transmitter devices 11 and receiver devices 15 communicate with each other. In such embodiments, the communication system 100 may further use, alone or in combination, any multiple access technique such as Time Division Multiple Access (TDMA), Frequency Division Multiple Access (FDMA), Code Division Multiple Access (CDMA), and Space-Division Multiple Access (SDMA).

In one application of the invention to optical communications, the communication system 100 may be an optical fiber-based communication system. The transmitter 11 and receiver 15 may be accordingly any optical transceivers capable of operating in optical fiber-based transmission systems. The transmission channel 13 may be any optical fiber link designed to carry data over short or long distances. In such embodiments, the information symbols conveyed by the transmitter 11 may be carried by optical signals polarized according to the different polarization states of the fiber. The optical signals propagate along the fiber-based transmission channel 11 according to one or more propagation modes until reaching the receiver 15.

In some embodiments corresponding to optical communications, the optical signal carrying the information symbols may be generated using a single wavelength lasers.

In other embodiments, wavelength division multiplexing (WDM) techniques may be used at the transmitter 11 to enable generating optical signals using a plurality of independent wavelengths.

In another application of the invention to optical communications using in particular multi-mode fibers, space division multiplexing techniques may be further used to multiplex the information symbols according to the various propagation modes.

Further, a multiple access technique such as WDMA (Wavelength Division Multiple Access) may be used in applications to optical communication systems.

The transmission channel 13 may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

In one application to wireless single-user MIMO systems, the complexity/performance tradeoff of QR-based sub-block decoding of a received signal may be optimized through an optimization of the sub-block division of the vector of information symbols. Exemplary applications of the various decoding methods and devices include, with no limitation, MIMO decoding in configurations implementable for example in:
  power-line wired communications standardized in the ITU G.hn and HomePlug AV2 specifications;
  wireless standards such as the Wi-Fi (IEEE 802.11n and IEEE 802.11ac), the cellular WiMax (IEEE 802.16e), the cooperative WiMax (IEEE 802.16j), the Long Term Evolution (LTE), the LTE-advanced, and the 5G ongoing standardization.

Further, the communication system 100 may be a cryptographic communication system in which a transmitter 11 may be configured to communicate data to at least one legitimate receiver 15 in the presence of at least one eavesdropper. An eavesdropper may be any device capable of intercepting data transferred over the communication system 100. The communication channel 13 may be in such embodiments and for example a wiretap channel.

In one application of the invention to cryptographic systems, a transmitter 11 may be configured to encrypt the data to be transmitted to at least one legitimate receiver 15. Encoding using lattice-based techniques may provide encoded data or signals in the form of lattice points. A legitimate receiver 15 may be accordingly configured to decrypt the encoded data receiver over the transmission channel 13 by applying decoding techniques according to the various embodiments. For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that the various embodiments of the invention apply to other communication systems such as wireless multi-user MIMO systems and optical MIMO systems. Generally, the invention may be applied to any communication system characterized by a linear representation (equivalently a lattice representation) of the channel output at receiver devices. In addition, although the number of transmit and receive antennas are greater than one (1), certain embodiments may have particular advantages in the presence of a number of transmit antennas greater than or equal to two ($n_t \geq 2$) and a number of receive antennas greater than or equal to two ($n_r \geq 2$).

Figure 2:
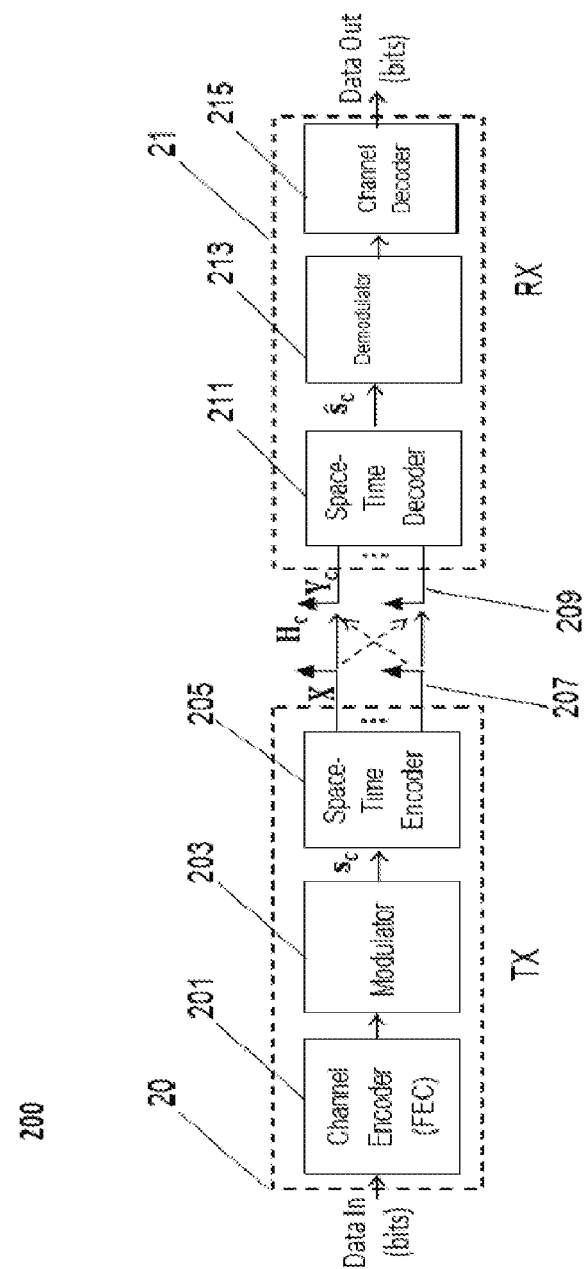
FIG. 2 is a block diagram of an exemplary application of the invention to wireless single-user MIMO systems, according to some embodiments.

Referring to FIG. 2, there is shown an exemplary wireless single-user MIMO communication system 200 in which various embodiments of the present invention may be implemented. The wireless single-user MIMO communication system 200 may comprise a transmitter 20 implementing a Space-Time Block Code (STBC) to multiplex the information symbols over time and space dimensions. Each transmitter 20 of a station may exchange data with a receiver 21 of another station according to the wireless communication system 200.

The wireless single-user MIMO communication system 200 may present a symmetric configuration. As used herein, a symmetric configuration refers to a configuration in which the transmitter 20 and the receiver 21 are equipped with the same number of antennas $n_t = n_r$. Alternatively, the MIMO configuration may be asymmetric, in which case the number $n_r$ of receive antennas differs from the number $n_t$ of transmit antennas. In particular, in one embodiment, in order to avoid a rank deficiency problem, the number $n_r$ of receive antennas may be larger than the number $n_t$ of antennas at the transmitter.

The transmitter 20 may convey a signal to a receiver 21 over a noisy wireless MIMO channel represented by a channel matrix $H_c$. The transmitter 20 may be implemented in different devices or systems capable of operating in wireless environments. Exemplary devices adapted for such applications comprise mobile phones, laptops, tablets, robots, IoT (Internet of Things) devices, base stations, etc. The transmitter 20 may be fixed or mobile. It may comprise for example:

- a channel encoder 201 implementing a Forward Error Correction (FEC) code such as a linear block code or a convolutional code;
- a modulator 203 implementing a modulation scheme such as Quadrature Amplitude Modulation (QAM) delivering a modulated symbol vector $s_c$;
- a Space-Time encoder 205 for delivering a codeword matrix X;
- $n_t$ transmit antennas 207, each transmit antenna being associated with a single-carrier or a multi-carrier modulator such as an OFDM or an FBMC modulator.

The transmitter 20 may be configured to encode a received flow of information bits as data input using a FEC encoder 201 implementing for example a linear block code or a convolutional code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_\kappa$ with q bits per symbol.

An information symbol $s_j$ has a mean power $E_s$, and can be written in the form:

$$s_j = Re(s_j) + iIm(s_j) \quad (1)$$

In equation (1):
- i denotes the complex number such that $i^2 = -1$, and
- the Re(.) and Im(.) operators respectively denote the real and imaginary parts of an input value.

When modulation formats such as $2^q$-QAM are used, the $2^q$ symbols or states represent a sub-set of the integer field $Z[i]$. The corresponding constellation comprises $2^q$ points representing the different states or symbols. In addition, in the case of squared modulations, the real and imaginary parts of the information symbols belong to the same finite alphabet $A = [-(q-1), (q-1)]$. The minimum distance $d_{min}$ of a modulation scheme, represents the Euclidean distance between two adjacent points in the constellation and is equal to 2 in such example.

A Space-Time Encoder 205 may be used to generate a codeword matrix X from the encoded symbols. The Space-Time Encoder 205 may use a linear STBC of length T. The Space-Time Encoder 205 may deliver a codeword matrix X of dimension $n_t \times T$ that belongs to a codebook C and is sent over T time slots. The coding rate of such codes is equal to $\kappa/T$ complex symbols per channel use, where $\kappa$ is the number of encoded complex-value symbols composing the vector $s_c = [s_1, s_2, \ldots, s_\kappa]^t$ of dimension $\kappa$ in this case. When full-rate codes are used, the Space-Time Encoder 205 encodes $\kappa = n_t T$ complex-value symbols. Examples of STBCs are the Perfect Codes. The Perfect codes provide full coding rates by encoding a number $\kappa = n_t^2$ ($T = n_t$) of complex information symbols and satisfy a non-vanishing determinant property.

In some embodiments, the Space-Time Encoder 205 may use a spatial multiplexing scheme known as V-BLAST scheme by multiplexing the received complex-value information symbols over the different transmit antennas without performing a coding in the time dimension.

The codeword thus constructed may be converted from the time domain to the frequency domain using a multicarrier modulation technique, using for example OFDM or FBMC modulators, and spread over the transmit antennas 207. Signals may be sent from the transmit antennas 207 optionally after filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrix $H_c$. In addition, the communication channel may be noisy, affected for example by a Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:

- a Space-Time decoder 211 configured to deliver, from the channel matrix $H_c$ and the channel output signal $Y_c$ an estimation $\hat{s}_c$ of the modulated symbol vector $s_c$;
- a demodulator 213 configured to generate a binary sequence by performing a demodulation of the estimated symbol vector $\hat{s}_c$;

a channel decoder 215 configured to deliver as output a binary signal being the estimation of the transmitted bits using for example the Viterbi algorithm.

The receiver 21 implements a reverse processing of the processing performed in the transmitter 20. Accordingly, if a single-carrier modulation is used at the transmitter rather than a multi-carrier modulation, then the $n_r$ OFDM of FBMC demodulators may be replaced by corresponding single-carrier demodulators.

Figure 3:
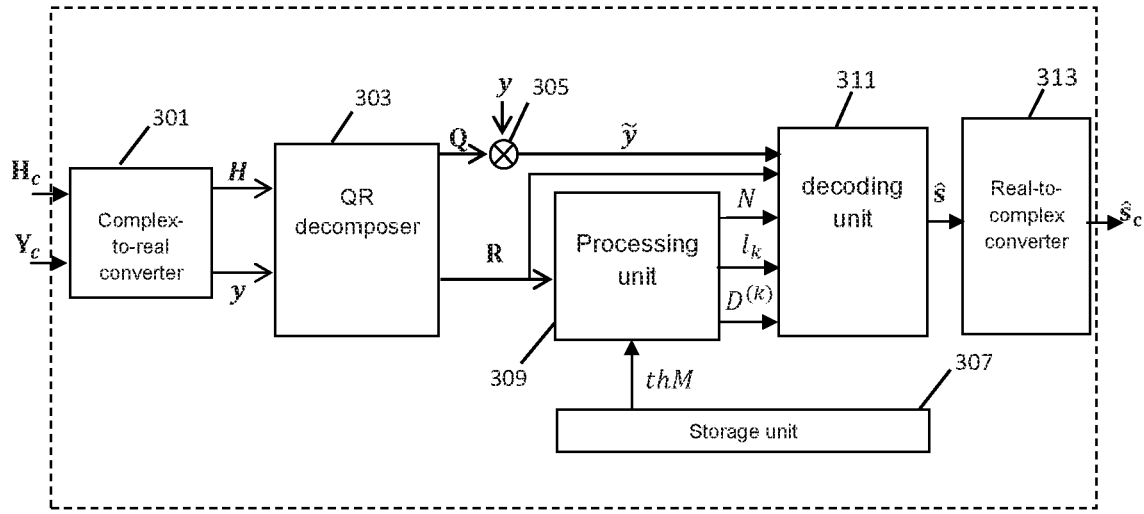
FIG. 3 is a block diagram representing the structure of a Space-Time decoder, according to some embodiments.

FIG. 3 is a block diagram of a Space-Time decoder 211 according to some embodiments. Accordingly, the Space-Time decoder 211 may comprise a complex-to-real converter 301 configured to convert the complex-value channel matrix $H_c$ into a real-value equivalent channel matrix H, and convert the complex-value channel output $Y_c$ into a real-value vector y of dimension n.

The Space-Time decoder 211 may comprise a QR decomposer 303 configured to generate an orthogonal matrix Q and an upper triangular matrix R by applying a QR decomposition to the real-value channel matrix such that H=QR. The components of the upper triangular matrix may be denoted by $R_{ij}$ and may be represented by a first value, denoted by i, defining a row index and a second value, denoted by j, designating a column index and a first value. Accordingly, a given component $R_{ij}$ is located at the $i^{th}$ row and the $j^{th}$ column.

The Space-Time decoder 211 may comprise a multiplication unit 305 configured to determine an auxiliary signal $\tilde{y}$ by scaling the real-value signal y by the transpose of the orthogonal matrix Q obtained from the QR decomposition of the real-value channel matrix such that $\tilde{y}=Q^t y$.

In one application of the invention to recursive sub-block decoding, the auxiliary signal $\tilde{y}$ and the upper triangular matrix R may be used in the decoding process. In such embodiments, the Space-Time decoder 211 may further comprise a processing unit 309 configured to determine a set of division parameters depending on at least one division metric derived from at least some components of the upper triangular matrix R.

In some embodiments, the at least one division metric may correspond to a number of components of the upper triangular matrix which are greater than or equal to a value, the value being a real-value number.

In one particular embodiment in which a value equal to zero (0) is considered, the at least one division metric is referred to as a "hard sparsity" division metric.

In another embodiment in which a value equal to a non-zero real-value is considered, the at least one division metric is referred to as a "soft sparsity" division metric. The non-zero real-value may be any positive or negative number from the field of real numbers.

In still another embodiment, the at least one division metric may be any function of the first value and the second value representing at least some components of the upper triangular matrix R. The function may further involve the values of the at least some components of the matrix R. In such embodiments, the at least one division metric is referred to as "weighted sparsity" division metric.

In other embodiments, the at least one division metric may correspond to a conditioning number.

It should be noted that in some embodiments, two or more different division metrics may be considered at the same time for a joint optimization.

In some embodiments, the set of division parameters may comprise at least one parameter chosen in a group consisting of a number of sub-blocks denoted by N and lengths of sub-blocks. The lengths of the N sub-blocks are denoted by $l^{(k)}$, for k=1, ..., N. The different lengths of the sub-blocks satisfy the equation $\Sigma_{k=1}^{N} l^{(k)} = n$.

The Space-Time decoder 211 may further comprise a decoding unit 311 configured to divide the upper triangular matrix into two or more sub-matrices using the determined set of division parameters in accordance with a division of the vector of information symbols into two or more sub-vectors. Each sub-matrix may comprise a number of rows higher than or equal to one (1). Each sub-vector may comprise a number of symbols higher than or equal to one.

In some embodiments, the number of the two or more sub-matrices may be determined from the number of sub-blocks N and the number of rows comprised in each sub-matrix may be determined from the lengths of sub-blocks. In particular, the number of sub-matrices may be equal to the number of sub-blocks N and the number of rows comprised in a sub-matrix of index k may be equal to $l^{(k)}$. Accordingly, the decoding unit 311 may be configured to divide the upper triangular matrix R into N rectangular sub-matrices denoted by $A^{(k)}$ such that:

$$R = \begin{pmatrix} R_{11} & \cdots & R_{1,n-1} & R_{1n} \\ 0 & \cdots & \vdots & \vdots \\ 0 & 0 & R_{n-1,n-1} & R_{n-1,n} \\ 0 & 0 & 0 & R_{nn} \end{pmatrix} = \begin{pmatrix} A^{(1)} \\ A^{(2)} \\ \vdots \\ A^{(N)} \end{pmatrix} \quad (2)$$

A sub-matrix $A^{(k)}$, for k=1, ..., N, is a rectangular matrix of dimension $l^{(k)} \times n$. Each sub-matrix $A^{(k)}$ comprises a number of rows equal to $l^{(k)}$. A matrix $A^{(k)}$ can be splitted into an upper triangular matrix $R^{(k)}$ and one or more rectangular matrices $B^{(j,k)}$ for j=k+1, ..., N.

The division of the upper triangular matrix corresponds to a division of the vector of information symbols into N sub-vectors $s^{(k)}$ for k=1, ..., N of length $l^{(k)}$ such that:

$$s = \begin{pmatrix} s_1 \\ s_2 \\ \vdots \\ s_n \end{pmatrix} = \begin{pmatrix} s^{(1)} \\ \vdots \\ s^{(N)} \end{pmatrix},$$

and a division of the auxiliary signal $\tilde{y}$ into N sub-vectors $\tilde{y}^{(k)}$ such that:

$$\tilde{y} = \begin{pmatrix} \tilde{y}^{(1)} \\ \vdots \\ \tilde{y}^{(N)} \end{pmatrix}$$

The decoding unit 311 may be further configured to determine at least one estimate $\tilde{s}^{(k)}$ of each sub-vector of information symbols $s^{(k)}$ by applying a symbol estimation algorithm $D^{(k)}$ corresponding to the $k^{th}$ sub-block. An estimate $\tilde{s}$ of the real-value vector of symbols s may be determined from the various estimates $\tilde{s}^{(k)}$, k=1, ..., N of the sub-vectors of information symbols such that:

$$\hat{s} = \begin{pmatrix} \hat{s}^{(1)} \\ \vdots \\ \hat{s}^{(N)} \end{pmatrix}$$

The Space-Time decoder 211 may further comprise a real-to-complex converter 313 configured to deliver a complex-value vector $\tilde{s}_c$ as an estimate of the original vector of complex-value symbols $s_c$.

According to some embodiments, the Space-Time decoder 211 may further comprise a storage unit 307 configured to store one or more symbol estimation algorithms. In such embodiments, the decoding unit 311 may be configured to select similar or different symbol estimation algorithms $D^{(k)}$ for $k=1, \ldots, N$ from the one or more symbol estimation algorithms.

A symbol estimation algorithm among said one or more symbol estimation algorithms may be any sequential algorithm, a linear decoding algorithm such as the ZF decoder or the MMSE decoder, or a non-linear ZF-DFE decoder.

In some embodiments, the Space-Time decoder 211 may be configured to previously determine the one or more symbol estimation algorithms depending on a signal-to-noise ratio and/or on a given value of the decoding computational complexity that can be supported by the receiver device 15 implementing the decoding algorithm and/or with respect to a target quality of service metric that needs to be satisfied.

According to some embodiments, the target quality of service metric may be related to the outage capacity of the transmission channel and/or on the achievable transmission rate.

According to some embodiments, the processing unit 309 may be configured to determine the set of division parameters from at least one current set of division parameters determined by performing an iterative processing.

In such embodiments, the processing unit 309 may be configured to iteratively determine a current set of division parameters providing a division of the upper triangular matrix R into a number of current sub-matrices and update said current set of division parameters in response to a division criterion related to the least one division metric derived from the components of said number of current sub-matrices. In such embodiments, the processing unit 309 may be configured to perform one or more iterations of the determination of a current set of division parameters until the division metric is satisfied.

According to some embodiments, the division criterion may correspond to the optimization of the value of at least one division metric per sub-matrix. The optimization may correspond to a maximization or to a minimization of the value of the at least one division metric per sub-matrix.

For example, in embodiments using soft, hard or weighted division metric, the division criterion may correspond to the maximization of the division metric per sub-matrix.

In another example related to embodiments in which a conditioning number is considered as a division metric, the optimization may correspond to the minimization of the conditioning number.

In embodiments involving two or more different division metrics, a joint optimization of the two or more different division metrics may be considered. For example, a joint optimization enabling the minimization of the conditioning number and the maximization of a sparsity division metric among the hard, soft or weighted sparsity division metric may be considered.

In some embodiments, the storage unit 307 may be configured to store one or more division metric thresholds. In such embodiments, the division criterion may depend on the value of at least one division metric with respect to the one or more division metric thresholds.

According to some embodiments, the one or more division metric thresholds may be previously determined by the Space-Time decoder 211 depending on a standard deviation of the noise affecting the transmission channel.

According to some embodiments, a division metric threshold associated with a division metric may be the same for the various current sub-matrices.

In other embodiments, a division metric threshold associated with a division metric may be different for the various current sub-matrices. Accordingly, a plurality of different division metric thresholds may be associated with each division metric, each division metric threshold being associated with each current sub-matrix among the current sub-matrices. Further, the plurality of different division metric thresholds may depend on the depth of the current sub-matrix on the upper triangular matrix. The depth of a current sub-matrix may be determined by a row index (i.e. the first value) defining at least some components of the current sub-matrix In some embodiments, the processing unit 309 may be configured to update a current set of division parameters by increasing or decreasing the number of sub-blocks and/or the lengths of sub-blocks.

According to some embodiments, the processing unit 309 may be configured to determine at a first iteration an initial set of division parameters from which at least one current set of division parameters may be determined.

In some embodiments in which the storage unit 307 is configured to store one or more symbol estimation algorithms, the processing unit 309 may be configured to determine the initial set of division parameters depending on the symbol estimation algorithms.

For example, in embodiments in which the symbol estimation algorithms comprise linear or non-linear decoding algorithms, the initial set of division parameters may comprise a number of sub-blocks equal to n such that the length of each sub-block is equal to $l^{(k)}=1$. Such initial division parameters provide a division of the upper triangular matrix into n sub-matrices, each sub-matrix comprising one row vector. The processing unit 309 may be configured to iteratively determine a current set of division parameters from the initial set of division parameters by decreasing the number of sub-blocks and increasing the length of each sub-block. Such an initial set of division parameters may advantageously enable reducing the computational decoding complexity. Moreover, the computational decoding complexity advantage may offer a higher data throughput by enabling the implementation of coding techniques at transmitter devices (for examples Error Correcting coding and Space-Time coding) that can provide high data rates at the cost of a high decoding complexity.

In another example, in embodiments in which the stored one or more symbol estimation algorithms comprise sequential decoding algorithms, the initial set of division parameters may comprise a number of sub-blocks equal to 1 such that there is only a single sub-block of length $l_1=n$. Such initial division parameters provide a single sub-matrix equal to the upper triangular matrix. The processing unit 309 may be configured to iteratively determine a current set of division parameters from the initial set of division parameters by increasing the number of sub-blocks and decreasing the length of each sub-block. Such an initial set of division parameters may advantageously enable improving the decoding error performance.

The processing unit 309 may be configured to perform the iterative update by processing the rows of the upper triangular matrix starting from the first row until reaching the last row or vice versa.

Figure 4:
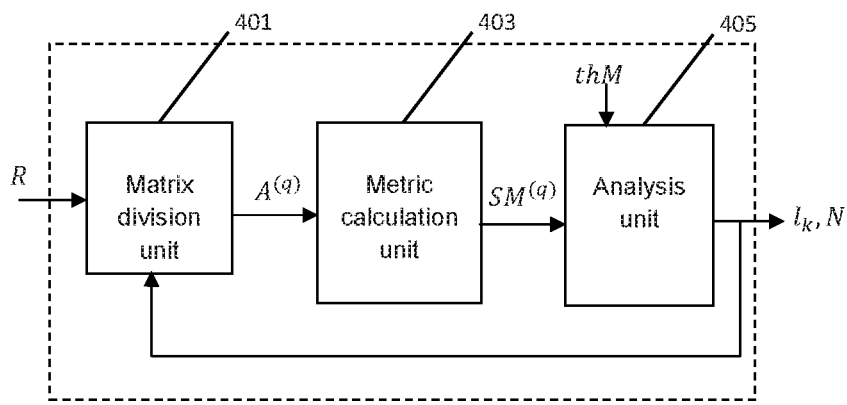
FIG. 4 is a block diagram representing the structure of a decoding unit, according to some embodiments.

FIG. 4 illustrates a structure of the decoding unit 311 according to some embodiments in application to QR-based recursive sub-block decoding. As illustrated in FIG. 4, the decoding unit 311 may comprise a division unit 401 configured to:
- divide the vectors s and $\tilde{y}$ into N sub-vectors $s^{(k)}$ and $y^{(k)}$ respectively, for k=1, . . . , N, where a sub-vector of index k has a length $l_k$, and
- divide the upper triangular matrix R into N rectangular sub-matrices denoted by $A^{(k)}$. Each sub-matrix $A^{(k)}$ of index k can be splitted into an upper-triangular sub-matrix $R^{(k)}$ and one or more rectangular sub-matrices $B^{(k,j)}$, k=1, . . . , N, j=k+1, . . . , N.

Using the sub-vectors $s^{(k)}$ and $\tilde{y}^{(k)}$ and the divided sub-matrices $R^{(k)}$ and $B^{(k,j)}$, a set of sub-blocks $(SB)_k$ may be defined. For each index k=1, . . . , N−1, a sub-block $(SB)_k$ may be defined as $(SB)_k = \{l_k, s^{(k)}, R^{(k)}, \tilde{y}^{(k)}, \tilde{w}^{(k)}, D^{(k)}, B^{(k,j)}, j=k+1, \ldots, N\}$. For k=N, the corresponding sub-block is given by $(SB)_N = \{l_N, s^{(N)}, R^{(N)}, \tilde{y}^{(N)}, \tilde{w}^{(N)}, D^{(N)}\}$.

The decoding unit 311 may further comprise N symbol estimation units 403 and N−1 successive interference cancellation (SIC) units 405. A SIC unit 405 may be associated with a sub-block $(SB)_k$ and may be configured to calculate a vector $\overline{y}^{(k)}$. A symbol estimation unit 403 may be associated with each sub-block $(SB)_k$ to determine an estimate $\hat{s}^{(k)}$ using a symbol estimation algorithm $D^{(k)}$. The decoding unit 311 may further comprise a serial converter 407 configured to determine the real-value vector $\hat{s}_r = [\hat{s}^{(1)}, \hat{s}^{(2)}, \ldots, \hat{s}^{(N)}]^t$ by aggregating the outputs of the N symbol estimation units.

In an application to a wireless Rayleigh fading multiple antenna system (single-user MIMO) for decoding a signal sent from a transmitter equipped with $n_t$ transmit antennas using a spatial multiplexing scheme and $2^q$-QAM modulation, to a receiver equipped with $n_r$ receive antennas with $n_r \geq n_t \geq 2$, the received complex-value signal may be written in the form:

$$y_c = H_c s_c + w_c \quad (3)$$

In equation (3), $y_c$ is a $n_r$-dimensional vector, $s_c$ denotes the complex-value vector of transmitted information symbols of dimension $n_t$. The complex-value $n_r \times n_t$ matrix $H_c$ represents the channel matrix comprising the fading gains. In a Rayleigh fading channel, the entries of the channel matrix $H_c$ are of independent identically distributed (i.i.d) complex Gaussian-type. The channel matrix may be estimated in coherent transmissions at the receiver using estimation techniques such as least square estimators. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled in equation (3) by the $n_r$-dimensional complex-value vector $w_c$.

Given the channel output, the receiver may attempt to generate an estimate of the original vector of information symbols.

Figure 5:
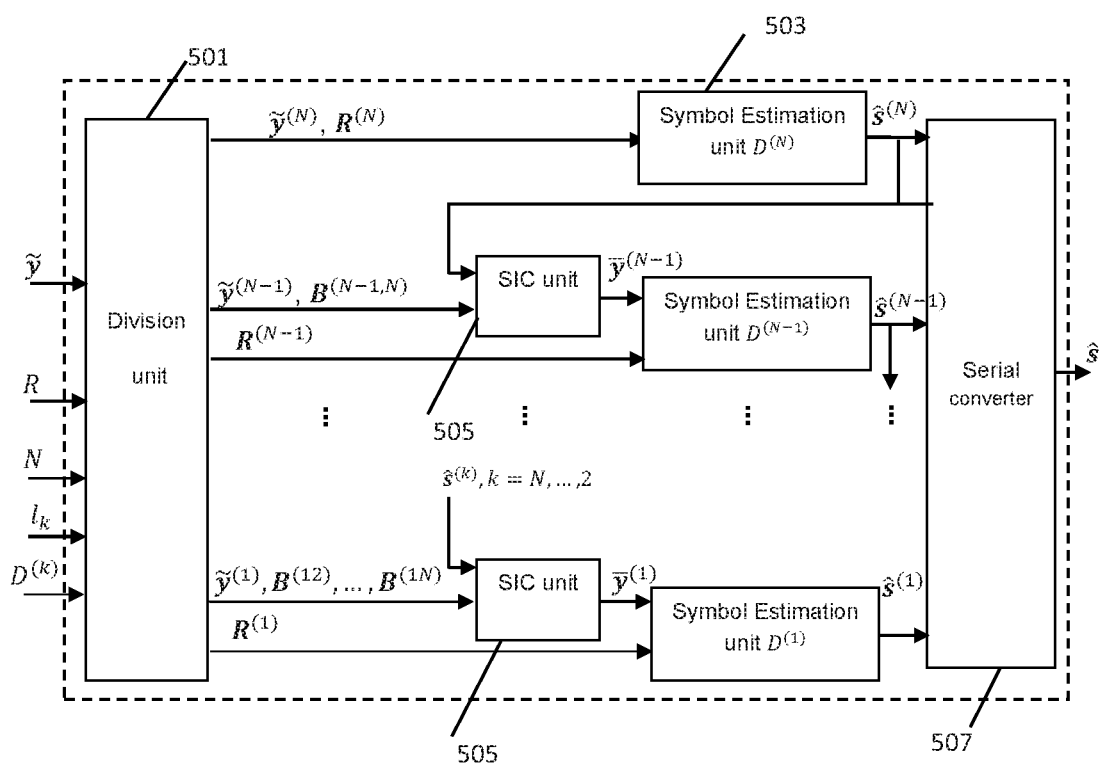
FIG. 5 is a flowchart depicting a method of sub-block decoding, according to some embodiments.

FIG. 5 is a flowchart depicting a decoding method, according to some embodiments in which a QR-based recursive sub-block decoding is considered. The sub-block decoding method may be implemented in the Space-Time decoder 211.

At step 501, a complex-to-real conversion may be performed to determine a real-value form of the received signal.

For example, in one embodiment using a spatial multiplexing scheme, the system in equation (3) may be transformed into:

$$y = \begin{bmatrix} \mathrm{Re}(y_c) \\ \mathrm{Im}(y_c) \end{bmatrix} = \begin{bmatrix} \mathrm{Re}(H_c) & -\mathrm{Im}(H_c) \\ \mathrm{Im}(H_c) & \mathrm{Re}(H_c) \end{bmatrix} \begin{bmatrix} \mathrm{Re}(s_c) \\ \mathrm{Im}(s_c) \end{bmatrix} + \begin{bmatrix} \mathrm{Re}(w_c) \\ \mathrm{Im}(w_c) \end{bmatrix} \quad (4)$$

The Re(.) and Im(.) operators in equation (4) designate the real and imaginary parts of each element composing the underlying vector or matrix.

Equation (4) can be written in the form:

$$y = Hs + w \quad (5)$$

To facilitate the understanding of the following embodiments, the following description will be made with reference to a spatial multiplexing scheme and involving a symmetric MIMO configuration where the transmitter and receiver are equipped with the same number of antennas $n_t = n_r$, for illustration purposes only. Accordingly, the real-value vectors y, s and w in equation (5) will be represented as n-dimensional vectors with $n = 2n_t = 2n_r$, and the equivalent real-value channel matrix H will be represented by a square n×n matrix. The vector s comprises the real and imaginary parts of the original complex information symbols composing the vector $s_c$.

At step 503, a preprocessing of the real-value channel matrix may be performed. One or more preprocessing techniques such as a lattice reduction, an MMSE-GDFE filtering, and an ordering of the columns and/or rows of the real-value channel matrix may be applied, alone or in combination.

At step 505, an upper triangular matrix R of dimension n×n and an orthogonal matrix Q of dimension n×n may be obtained by applying a QR decomposition to the real-value channel matrix such that H=QR. In embodiments using preprocessing techniques, the QR decomposition may be applied to the preprocessed channel matrix. The system in equation (5) can accordingly be written as:

$$y = QRs + w \quad (6)$$

In one application to recursive sub-block decoding, a sub-block decoding may be performed to recover at least an estimation of the original information symbols. Sub-block decoding requires a division of the upper triangular matrix into sub-matrices and a division of the real-value vector s into sub-vectors. Each sub-vector of information symbols will be decoded separately given the corresponding divided sub-matrix, the previously decoded sub-vectors of symbols, and the corresponding symbol estimation algorithm.

Embodiments of the invention provide efficient sub-block division techniques for determining a set of division parameters enabling a division of the upper triangular matrix using which optimized tradeoffs between the sub-block decoding computational complexity and the decoding error performances can be obtained.

Step 507 may be performed to determine a set of division parameters depending on at least one division metric derived from at least some components of the upper triangular matrix R.

According to some embodiments, the set of division parameters may comprise at least one parameter chosen in a group consisting of a number of sub-blocks denoted by N and the length of each sub-block $l^{(k)}$ for k=1, . . . , N such that $\Sigma_{k=1}^{N} l^{(k)}$=n. The following description will be made with reference to a set of division parameters comprising the number of sub-blocks and the length of each sub-blocks (N, $l^{(k, k=1, \ldots, N)}$).

According to some embodiments, the at least one division metric may correspond to a number of components of the upper triangular matrix which are greater than or equal to a value, the value being a real-value number.

A matrix with a number of zero components higher than the number of non-zero components is known as a sparse matrix. In contrast, a dense matrix is a matrix that has a number of non-zero entries larger than the number of zero components.

A zero-value component in the upper triangular matrix used in the sub-block recursive decoding process indicates an independence between two information symbols comprised in the vector of the information symbols. Accordingly, in certain embodiments of the invention applied to QR-based sub-block decoding, considering a sparse upper triangular matrix R in the decoding process may advantageously enable a reduction of the number of required computational operations involved in the decoding process.

Accordingly, in particular embodiments using a hard sparsity division metric, the value may be advantageously equal to zero (0) enabling an optimized division of the upper triangular taking into account the number of the zero-value components. Such division may enable a parallelized decoding of the independent information symbols, thereby reducing the decoding computational complexity.

According to other embodiments using a soft sparsity division metric, the value may be any non-zero real number.

In other embodiments, the determination of the set of parameters may further take into account the positions of at least some components of the upper triangular matrix. In particular, a weighted sparsity division metric may be considered. A weighted sparsity metric may be any function of the row index i and/or the column index j of at least some components $R_{ij}$ of the upper triangular matrix R. The division of the upper triangular matrix taking into account the positions of the components, in particular the components having zero values, may enable accelerating the convergence of the sub-block decoding process and reducing the propagation of decoding errors between the different sub-vectors of symbols.

In still other embodiments, the determination of the set of parameters may take into account the orthogonality of the sub-matrices comprised in the sub-blocks used for the sub-block decoding. Such division may enable improving for improving the performances of the symbol estimation algorithms implemented in the various sub-blocks for determining estimates of the sub-vectors of information symbols. In a particular embodiment, the at least one division metric may be a conditioning number.

According to some embodiments, two or more different division metrics may be considered for determining the set of parameters.

Step 509 may be performed to determine a symbol estimation algorithm $D^{(k)}$ for k=1, . . . , N.

According to some embodiments, the symbol estimation algorithms $D^{(k)}$ may be selected from one or more symbol estimation algorithms previously determined or loaded from storage means.

According to some embodiments, the one or more symbol estimation algorithms may have been previously determined depending on a signal-to-noise ratio and/or on the computational capabilities of devices or systems implementing the sub-block decoding method. Further, the one or more symbol estimation algorithms may have been previously determined depending on a target quality of service metric that is required such as an outage capacity of the transmission channel and/or a target achievable transmission rate.

According to one embodiment, the symbol estimation algorithms $D^{(k)}$ may be similar.

According to another embodiment, the symbol estimation algorithms $D^{(k)}$ may be different.

In some embodiments, a symbol estimation algorithm may be, and not limited to, any sequential algorithm, a linear decoding algorithm such as the ZF or the MMSE decoders, or a non-linear ZF-DFE decoder.

In an application to QR-based sub-block decoding, the system in equation (6) may be first transformed at step 511 into:

$$\tilde{y}=Q^t y=Rs_t+\tilde{w} \qquad (7)$$

In equation (7), $\tilde{w}=Q^t w$ designates a scaled noise vector. Given the orthogonality of the matrix Q, the system in equation (9) is equivalent to the one given in equation (6).

The real-value equivalent system of equation (7) may be considered for the estimation of the originally transmitted information symbols.

ML decoding of the information symbols can be formalized by the optimization problem given by:

$$\hat{s}_{ML}=\mathrm{argmin}_{s \in A^n}\|\tilde{y}-Rs\|^2 \qquad (8)$$

In equation (8), A designates the alphabet to which belong the real and imaginary parts of the complex-value vector $s_c$ composing the real vector s. An ML metric maybe defined in relation with the ML decoding problem as:

$$m(s)=\|\tilde{y}-Rs\|^2 \qquad (9)$$

In an application to sub-block decoding, a division of the upper triangular matrix into two or more sub-matrices and a division of the real-value vector of information symbols into two or more sub-vectors may be performed using the determined set of division parameters. Each sub-matrix may comprise a number of rows higher than or equal to one (1). Each sub-vector may comprise a number of symbols higher than or equal to one.

In some embodiments, the number of the two or more sub-matrices may be determined from the number of sub-blocks N and the number of rows comprised in each sub-matrix may be determined from the lengths of sub-blocks. In particular, the number of sub-matrices may be equal to the number of sub-blocks N and the number of rows comprised in a sub-matrix of index k may be equal to $l^{(k)}$.

The following description will be made with reference to a number of sub-matrices equal to the number of sub-blocks N and a number of rows comprised in a sub-matrix of index k equal to $l^{(k)}$, for illustration purpose only. However, the skilled person will readily understand that the number of sub-matrices may be lower than or equal to the number of sub-blocks for example in embodiments involving a parallelization of the decoding process implemented within a sub-block.

Accordingly, step 513 may be first performed to divide the vector ỹ into N sub-vectors such that $$\tilde{y} = \begin{bmatrix} \tilde{y}^{(1)} \\ \vdots \\ \tilde{y}^{(N)} \end{bmatrix}.$$

A sub-vector $\tilde{y}^{(k)}$ of index k, for k=1, . . . , N has a lengths $l^{(k)}$. Similarly, a sub-vector division may be applied to the real-value vector of information symbols s and to the noise vector $\tilde{w}$ to determine N sub-vectors $s^{(k)}$ and N sub-vectors $\tilde{w}^{(k)}$ of lengths $l^{(k)}$ such that $$s = \begin{bmatrix} s^{(1)} \\ \vdots \\ s^{(N)} \end{bmatrix} \text{ and } \tilde{w} = \begin{bmatrix} \tilde{w}^{(1)} \\ \vdots \\ \tilde{w}^{(N)} \end{bmatrix}.$$

The division of the vectors ỹ, s and $\tilde{w}$ is performed in accordance with a division of the upper triangular matrix R into sub-matrices $A^{(k)}$ according to equation (2). Each sub-matrix $A^{(k)}$ of index k for k=1, . . . , N may be splitted into:
 a square upper triangular sub-matrix $R^{(k)}$ of dimension $l^{(k)} \times n$; and
 one or more rectangular sub-matrices $B^{(kj)}$ for j=k+1, . . . , N.

Accordingly, the sub-matrices division of the upper triangular matrix R can be equivalently expressed as:

$$R = \begin{bmatrix} R_{11} & \cdots & R_{1,n-1} & R_{1n} \\ 0 & \vdots & \vdots & \vdots \\ 0 & 0 & R_{n-1,n-1} & R_{n-1,n} \\ 0 & 0 & 0 & R_{nn} \end{bmatrix} = \begin{bmatrix} A^{(1)} \\ \vdots \\ A^{(N-1)} \\ A^{(N)} \end{bmatrix} = \begin{bmatrix} R^{(1)} & \cdots & B^{(1N-1)} & B^{(1N)} \\ 0 & \cdots & \vdots & \vdots \\ 0 & 0 & R^{(N-1)} & B^{(N-1N)} \\ 0 & 0 & 0 & R^{(N)} \end{bmatrix} \quad (10)$$

The determined set of division parameters, the symbol estimation algorithms, the divided sub-matrices $R^{(k)}$ and $B^{(kj)}$ of the upper triangular matrix R, and the divided sub-vectors $\tilde{y}^{(k)}$ may be grouped into sub-blocks $(SB)_k$, k=1, . . . , N. A sub-block $(SB)_k$, for k=1, . . . , N−1, may be defined by a set of parameters such that $(SB)_k = \{l_k, s^{(k)}, R^{(k)}, \tilde{y}^{(k)}, \tilde{w}^{(k)}, D^{(k)}, B^{(kj)}, j=k+1, \ldots, N\}$, where:

$$\tilde{y}^{(k)} = R^{(k)} s^{(k)} + \Sigma_{j=k+1}^{N} B^{(kj)} s^{(j)} + \tilde{w}^{(k)} \quad (11)$$

For k=N, the sub-block of index N may be defined by $(SB)_N = \{l_N, s^{(N)}, R^{(N)}, \tilde{y}^{(N)}, \tilde{w}^{(N)}, D^{(N)}\}$ such that:

$$\tilde{y}^{(N)} = R^{(N)} s^{(N)} + \tilde{w}^{(N)} \quad (12)$$

Systems in equations (11) and (12) may be used for the decoding of the various sub-vectors of information symbols.

According to such groups of sub-blocks, the ML decoding metric in equation (8) may be written as:

$$m(s) = \|\tilde{y} - Rs_t\|^2 = \|\Sigma_{k=1}^{N} \tilde{y}^{(k)} - (R^{(k)}(k) s^{(k)} + \Sigma_{j=k+1}^{N} B^{(kj)} s^{(j)})\|^2 \quad (13)$$

Accordingly, a sub-block estimation of the original sub-vectors of symbols $s^{(k)}$, k=N, N−1, . . . , 1 may be performed recursively at steps 517 to 525. An initialization may be performed at step 515 corresponding to k=N.

Step 517 may be repeated for each sub-block $(SB)_k$, k=N, N−1, . . . 1 to determine a sub-vector estimation $\hat{s}^{(k)}$ of the sub-vector of symbols $s^{(k)}$ of the real-value vector s. For each k=N−1, . . . 1, a sub-vector $\overline{y}^{(k)} = \tilde{y}^{(k)} - \Sigma_{j=k+1}^{N} B^{(kj)} \hat{s}^{(j)}$ may be computed at step 523 from the previously estimated sub-vectors $\hat{s}^{(j)}$ and the rectangular sub-matrices $B^{(kj)}$, j=k+1, . . . , N. An estimate of the sub-vector of index k may be determined using the symbol estimation algorithm $D^{(k)}$, the upper triangular matrix $R^{(k)}$, and the calculated sub-vector $\overline{y}^{(k)}$. For k=N, the estimate $\hat{s}^{(N)}$ may be determined using the corresponding symbol estimation algorithm $D^{(N)}$, the corresponding upper triangular sub-matrix $R^{(N)}$ and the vector $\overline{y}^{(N)} = \tilde{y}^{(N)}$ initialized at step 515.

If it is determined at step 521 that all the sub-vectors of symbols have been estimated, step 525 may be performed to construct an output, from the sub-vectors $\hat{s}^{(k)}$, k=1, . . . , N, as an estimation $\hat{s}_c$ of the complex-value vector of information symbols $s_c$. The construction step may comprise two phases. First, a real-value vector $s = [\hat{s}^{(1)}, \ldots, \hat{s}^{(N)}]^t$ may be constructed by aggregating the different sub-vector estimates. Then, the obtained vector ŝ may be converted into the complex-value vector $\hat{s}_c = [\hat{s}_1, \hat{s}_2, \ldots, \hat{s}_{n/2}]^t$ such that a component $\hat{s}_j$ for j=1, . . . , n/2 is given by:

$$\hat{s}_j = (\hat{s})_j + i(\hat{s})_{j+n/2} \quad (14)$$

In equation (14), $(u)_j$ denotes the $j^{th}$ element of a vector u.

In one embodiment where a sequential decoder is used in a given sub-block $(SB)_k$, the corresponding symbol estimation algorithm $D^{(k)}$ may deliver an estimate $\hat{s}^{(k)}$ by minimizing the sub-block metric $m(s^{(k)}) = \|\overline{y}^{(k)} - R^{(k)} s^{(k)}\|^2$ according to:

$$\hat{s}^{(k)} = \operatorname{argmin}_{s^{(k)} \in A^{l_k}} m(s^{(k)}) = \operatorname{argmin}_{s^{(k)} \in A^{l_k}} \|\overline{y}^{(k)} - R^{(k)} s^{(k)}\|^2 \quad (15)$$

Sequential tree-search algorithms such as the Sphere Decoder (SD), the Stack decoder and the SB-Stack decoder (SB-Stack), may be used to solve equation (15).

Further, in certain embodiments, a preprocessing on the upper triangular sub-matrices $R^{(k)}$ prior to decoding may be performed using for example a lattice reduction and/or an MMSE-GDFE filtering. Preprocessing methods may be also applied to the channel matrix prior to sub-block division and decoding.

Figure 6:
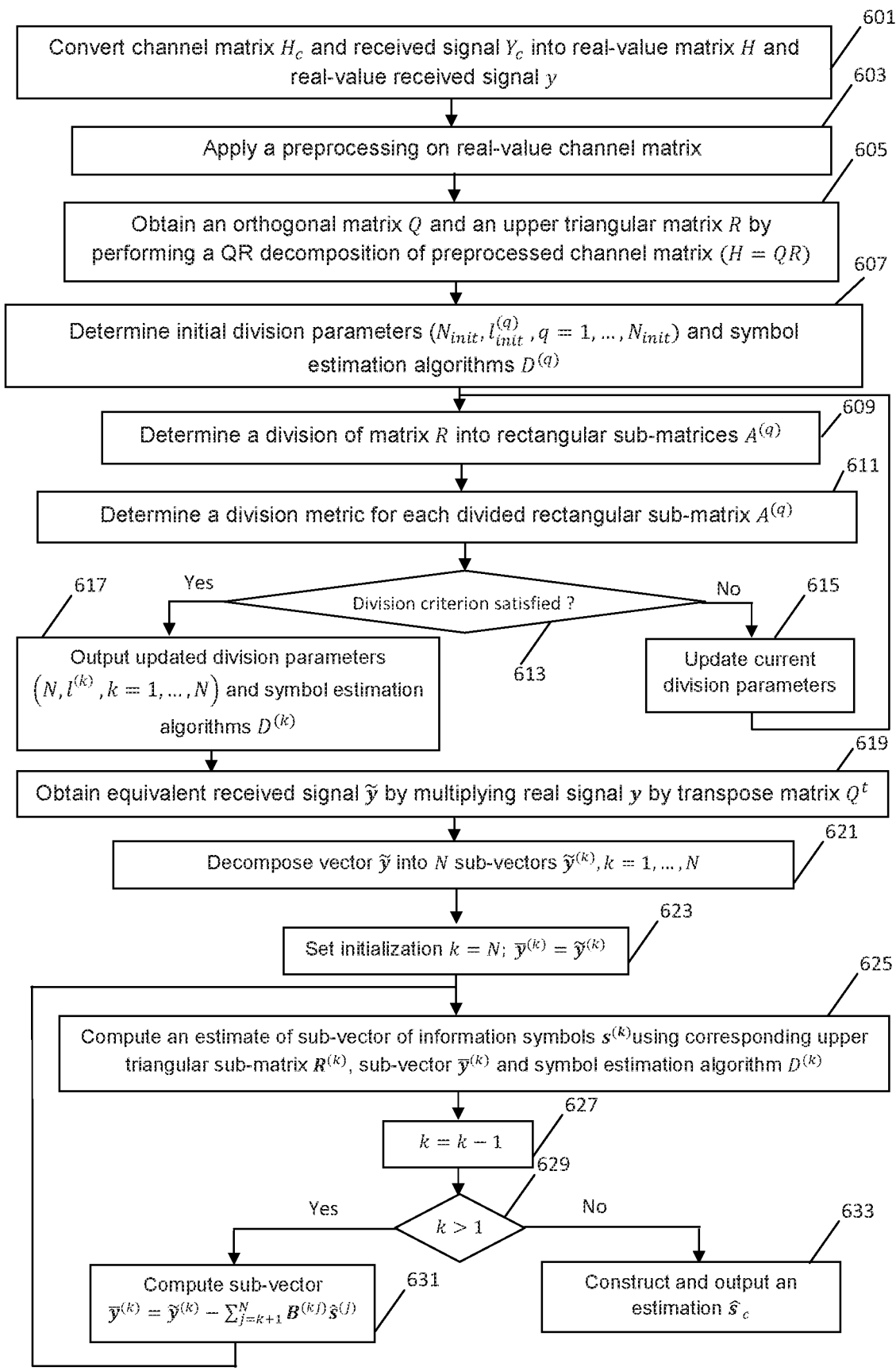
FIG. 6 is a flowchart depicting a method of determining a set of division parameters for sub-block decoding, according to some embodiments.

FIG. 6 is a flowchart depicting a method of determining a set of division parameters, according to some embodiments based on an iterative determination of a set of division parameters and update of the current set of division parameters in response to a division criterion.

A current set of division parameters denoted by $(N_{it}, l_{it}^{(k)}, k=1, \ldots, N_{it})$ and comprising a current number of sub-blocks $N_{it}$ and current lengths of sub-blocks $l_{it}^{(k)}$, k=1, . . . , $N_{it}$ may provide a division of the upper triangular matrix into a number of current sub-matrices denoted by $A_{it}^{(k)}$, for k=1, . . . , $N_{it}$, a current sub-matrix $A_{it}^{(k)}$ of index k comprising $l_{it}^{(k)}$ rows and n columns. Accordingly, the division criterion may be related to at least one division metric derived from at least some components of the number of current sub-matrices.

The set of division parameters may be determined from at least one current set of division parameters. In particular, the set of division parameters may be determined from the last updated current set of division parameters in response to the satisfaction of a stopping condition.

Step 601 may be performed to receive the real-value upper triangular matrix R and one or more division metric thresholds.

Step 603 may be performed to initialize an index of the current iteration to it=1. The index of the current iteration indicates the number of the processed iterations.

Step 605 may be performed to determine an initial set of division parameters $(N_1, 1_1^{(k)}, k=1, \ldots, N_1)$ corresponding to the first iteration of the iterative method.

According to some embodiments, the initial set of division parameters may be determined depending on the one or more symbol estimation algorithms from which the symbol estimation algorithms $D^{(k)}$ may be selected.

In one embodiment, if the one or more symbol estimation algorithms comprise linear or non-linear decoding algorithms, the initial set of division parameters may comprise a number of sub-blocks $N_1=n$ such that the length of each sub-block is equal to $1_1^{(k)}=1$, for $k=1, \ldots, N_1$.

In another embodiment, if the one or more symbol estimation algorithms comprise sequential decoding algorithms, the initial set of division parameters may comprise a number of sub-blocks $N_1=1$ such that there is only a single sub-block of length $1_1^{(1)}=n$.

According to other embodiments, the initial lengths of the sub-blocks may be equal or may be different.

Given a current set of division parameters $(N_{it}, 1_{it}^{(k)}, k=1, \ldots, N_{it})$, step 607 may be performed to determine a division of the upper triangular matrix into $N_{it}$ current sub-matrices $A_{it}^{(k)}$ such that:

$$R = \begin{bmatrix} R_{11} & \cdots & R_{1,n-1} & R_{1n} \\ 0 & \vdots & \vdots & \vdots \\ 0 & 0 & R_{n-1,n-1} & R_{n-1,n} \\ 0 & 0 & 0 & R_{nn} \end{bmatrix} = \begin{bmatrix} A_{it}^{(1)} \\ A_{it}^{(2)} \\ \vdots \\ A_{it}^{(N_{it}-1)} \\ A_{it}^{(N_{it})} \end{bmatrix} \quad (16)$$

At the first iteration of the method, the division of the upper triangular matrix may be performed using the initial set of division parameters.

According to some embodiments, the update of a current set of division parameters $(N_{it}, 1_{it}^{(k)}, k=1, \ldots, N_{it})$ may be performed in response to a division criterion related to at least one division metric derived from the components of the current sub-matrices $A_{it}^{(k)}$.

Accordingly, step 609 may be performed to determine at least one division metric in association with at least one current sub-matrix $A_{it}^{(k)}$.

According to some embodiments, a same division metric may be determined in association with at least some of the current sub-matrices.

In other embodiments, two or more different division metrics may be evaluated for at least two different current sub-matrices.

According to some embodiments, the at least one division metric may be, and not limited to, a hard sparsity division metric or a hard sparsity division metric or a weighted sparsity metric or a conditioning number of a current sub-matrix $A_{it}^{(k)}$.

The conditioning number of a given matrix designates an orthogonality measure indicative of the orthogonality of its column vectors. The smaller the conditioning number is, the better the orthogonality of the column vectors. For a matrix U, the conditioning number denoted by $\tau(U) \in [0,1]$ is given by:

$$\tau(U) = \frac{\sigma_{min}}{\sigma_{max}} \quad (17)$$

In equation (17), $\sigma_{min}$ and $\sigma_{max}$ correspond respectively to the minimum and maximum singular values of the matrix U.

Step 611 may be performed to determine whether a division criterion is satisfied.

According to an embodiment, the division criterion may correspond to the optimization of at least one division metric, the division criterion being satisfied if at least one division metric is optimized in association with at least one current sub-matrix.

The optimization may correspond to a maximization or to a minimization of at least one division metric. Accordingly, the update of a current set of division parameters may be performed in a way that maximizes or minimizes the values of at least one division metric per divided sub-matrix $A_{it}^{(k)}$. The maximization criterion may correspond for example to embodiments involving a soft, a hard, or a weighted sparsity division metric. The minimization criterion may correspond for example to embodiments involving a conditioning number.

According to another embodiment in which one or more division metric thresholds are considered, the division criterion may depend on the value of at least one division metric with respect to one or more division metric thresholds. The division metric thresholds may indicate a minimum or sufficient 'quality' of the current sub-matrices enabling to reach a required or a target quality of service specifications when used in the sub-block decoding process.

In such embodiments, step 611 may be performed to compare a determined at least one division metric to a division metric threshold from the one or more division metric thresholds, the comparison enabling to determine if the division criterion is satisfied.

For example, the division criterion may correspond to having at least one division metric associated with at least one current sub-matrix of a value higher than or equal to a division metric threshold. In such embodiments, step 611 may be performed to determine if at least one division metric in association with at least one current sub-matrix is higher than or equal to a division metric threshold.

In some embodiments, a same division metric threshold associated with a division metric may be used for all the current sub-matrices. Alternatively, the division metric thresholds may be different for at least some of the current sub-matrices depending for example on the depth of a current sub-matrix within the upper triangular matrix. The depth of a current sub-matrix may be determined by a row index defining at least some components of the current sub-matrix.

For example, for current sub-matrices corresponding to sub-vectors of information symbols located in the bottom of the real-value vector of information symbols, a higher division metric threshold may be considered. The adaptation of the division metric threshold to the depths of the current sub-matrices may advantageously enable decoupling information symbols and accelerating the convergence of the sub-block decoding process.

Further, in some embodiments, the one or more division metric thresholds may have been previously determined depending on the standard deviation a of the noise w affecting the transmission channel.

If it is determined at step 611 that a division criterion is not satisfied, step 613 may be performed to update the current set of division parameters ($N_{it}$, $l_{it}^{(k)}$, k=1, ..., $N_{it}$), a current set of division parameters corresponding to a possible set of division parameters enabling a division of the upper triangular matrix into at least two sub-matrices, each sub-matrix among the at least two sub-matrices being represented by a number of rows higher than or equal than one (1) and lower than or equal to n−1, that is $1 \le l_{it}^{(k)} \le n-1$.

According to some embodiments, the update of a current set of parameters $N_{it}$, $l_{it}^{(k)}$, k=1, ..., $N_{it}$) may consist in increasing or decreasing the current number of sub-blocks $N_{it}$ and/or increasing or decreasing at least one current length of sub-blocks $l_{it}^{(k)}$ for k=1, ..., $N_{it}$.

Given the updated current set of division parameters, step 615 may be performed to determine whether a stopping condition is reached declaring a termination of the iterative process. The stopping condition may correspond to a determination of at least one division metric from all the components of the upper triangular matrix, which means that all the possible sets of division parameters enabling a division of the upper triangular matrix into at least two sub-matrices have been explored.

If it is determined at step 615 that a stopping condition is not reached, step 617 may be performed to increment the index of the current iteration such that it=it+1.

If it is determined at step 611 that a division criterion is satisfied or if it is determined at step 615 that a stopping condition is reached, step 619 may be performed to output the last updated current set of division parameters as the set of division parameters determined by the method.

Although certain embodiments have been described in relation with MIMO systems using spatial multiplexing of information symbols, it should be noted that the invention is also applicable in configurations using linear Space-Time Block codes. In the presence of a Space-Time Block code of length T and encoding K symbols, the real-value expression of the channel output can be written in the linear representation form of equation (4) where the equivalent channel matrix is the real-value $2n_rT \times 2\kappa$ matrix $H_{eq}$ given by:

$$H_{eq} = (I_T \otimes H)G \quad (18)$$

The $2n_rT \times 2\kappa$ matrix G designates a real-value matrix known as a generator matrix or coding matrix of the linear Space-Time Block code. $I_T$ denotes the identity matrix of dimension T and the operator $\otimes$ is the Kronecker matrices product.

Furthermore, while certain embodiments of the invention have been described in relation with symmetric MIMO configurations characterized by a same number of transmit and receive antennas, it should be noted that the invention may also be applied in asymmetric MIMO configurations with $n_t < n_r$. A linear representation in the form of equation (5) can also be obtained by performing the complex-to-real conversion of step 701 to the equivalent system given by:

$$U^\dagger y_c = DV^\dagger s_c + U^\dagger w_c \quad (19)$$

In equation (19), the matrices U and V are unitary matrices obtained, together with matrix D, from the singular value decomposition of the matrix $H_c = UDV^t$. D is a diagonal matrix having positive diagonal entries representing the singular values of the matrix $H_C$. The superscript $(.)^\dagger$ designates the Hermitian transposition operator.

Further, the various embodiments of the invention are not limited to particular types of recursive sub-block decoding, and apply to any other types of sub-block decoding such as Semi-exhaustive Recursive Sub-Block decoding described in patent application EP No 15306808.5. Further, the various embodiments of the invention may apply to both hard and soft decoding.

In one application to soft-output decoding, the decoding methods and devices may be used to generate a list of estimates of the original vector of information symbols. The list thus obtained can be used to calculate the log likelihood ratio values for approximating the extrinsic information of the different information bits carried by the original information symbols. Several iterations of steps 515 to 525 may be performed in order to fill the list of estimates.

The methods and devices described herein may be implemented by various means. For example, these techniques may be implemented in hardware, software, or a combination thereof. In a hardware implementation, the processing elements of a Space-Time decoder 211 can be implemented for example according to a hardware-only configuration (for example, in one or more FPGA, ASIC or VLSI integrated circuits with the corresponding memory) or according to a configuration using both VLSI and DSP.

Figure 7:
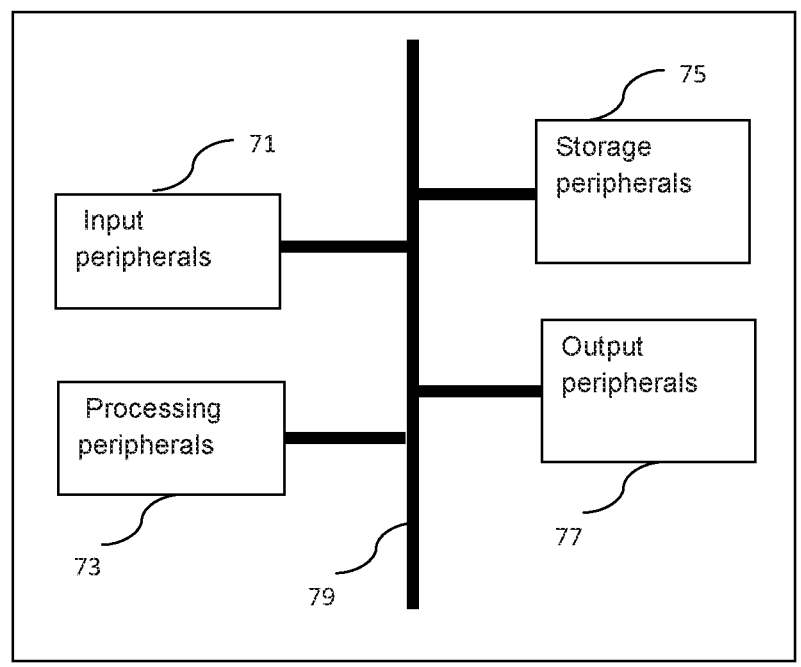
FIG. 7 illustrates a hardware architecture of a Space-Time decoder according to some embodiments.

FIG. 7 represents an exemplary hardware architecture of the Space-Time decoder 211, according to certain embodiments of the invention. The hardware architecture may be implemented in a machine or computer executed device. As illustrated, the Space-Time decoder 211 may include various computing, storage and communication units possibly interacting with one another through a data and address port 79 and comprising:

Input peripherals 71 for receiving for example input data from the receive antennas 209;

Processing peripherals 73 comprising one or more microprocessors (CPU) such as an FPGA or an ASIC configured for example to execute the corresponding instructions to run the methods and algorithms according to the various embodiments of the invention;

Storage peripherals 75 possibly comprising a random access memory (RAM) or a read-only memory to store for example the sub-block decoding parameters and the set of transformation matrices and auxiliary channel matrices computed prior to decoding.

Output peripherals 77 comprising communication means such as displays enabling for example man-to-machine interaction between the receiver device 21 and a MIMO system administrator for configuration and maintenance purposes.

Further, while some embodiments of the invention have been described in relation to a wireless single-user MIMO system, it should be noted that the invention is not limited to such an application. The invention may be integrated in any receiver device operating in any linear communication system characterized by a linear representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular communications applied in 3G, 4G, LTE, and future 5G standard. Cooperative communications applied for example in ad-hoc networks (wireless sensor networks, machine-to-machine communications, internet of things, etc) are also examples of distributed MIMO systems. In an application to wireless networks, the invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, some embodiments may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A decoder for decoding a signal received through a transmission channel in a communication system, said signal comprising a vector of information symbols, said transmission channel being represented by an upper triangular matrix, wherein the decoder comprises:
a processing unit configured to determine a set of division parameters depending on at least one division metric derived from components of said upper triangular matrix;
a decoding unit configured to divide said upper triangular matrix into two or more sub-matrices using said set of division parameters in accordance with a division of said vector of information symbols into two or more sub-vectors, and to determine at least one estimate of each sub-vector of information symbols by applying a symbol estimation algorithm, wherein the decoder is configured to determine at least one estimate of said vector of information symbols from the estimates of said sub-vectors of information symbols.

2. The decoder of claim 1, wherein said set of division parameters comprises at least one division parameter chosen in a group consisting of a number of said two or more sub-matrices and a number of rows comprised in each sub-matrix from said two or more sub-matrices.

3. The decoder of claim 1, wherein said at least one division metric is a function of a number of components being greater than or equal to a value, said value being a real number.

4. The decoder of claim 3, wherein said value is equal to zero.

5. The decoder of claim 1, wherein each component of said upper triangular matrix is represented by a first value and a second value, said first value defining a row index and said second value defining a column index, said at least one division metric being a function of the first value and/or the second value representing said at least some components of said upper triangular matrix.

6. The decoder of claim 5, wherein said at least one division metric is a conditioning number.

7. The decoder of claim 1, wherein it further comprises a storage unit configured to store one or more symbol estimation algorithms, said decoding unit being configured to select said symbol estimation algorithm from said one or more symbol estimation algorithms.

8. The decoder of claim 1, wherein said processing unit is configured to iteratively determine a current set of division parameters, said current set of division parameters providing a number of current sub-matrices, said processing unit being configured to determine said at least one division metric from the components of said current sub-matrices and to update said current set of division parameters in response to a division criterion related to said at least one division metric, said set of division parameters being determined from at least one current set of division parameters.

9. The decoder of claim 7, wherein said processing unit is configured to determine an initial set of division parameters depending on said one or more symbol estimation algorithms and to determine at least one current set of division parameters from said initial set of division parameters.

10. The decoder of claim 7, wherein it is further configured to previously determine said one or more symbol estimation algorithms depending on a signal-to-noise ratio and/or on a value of an outage capacity of the transmission channel and/or on a value of a transmission rate.

11. The decoder of claim 8, wherein said division criterion is based on the optimization of said at least one division metric.

12. The decoder of claim 10, wherein said division criterion depends on the value of said at least one division metric with respect to one or more division metric thresholds.

13. The decoder of claim 12, wherein said one or more division metric thresholds depend on a standard deviation of a noise affecting the transmission channel and/or on said first value defining at least some components of said upper triangular matrix.

14. The decoder of claim 1, wherein the communication system is a cryptographic communication system, said signal being encoded using at least one cryptographic secret value.

15. A method for decoding a signal received through a transmission channel in a communication system, said signal comprising a vector of information symbols, said transmission channel being represented by an upper triangular matrix, wherein the method comprises:
- determining a set of division parameters depending on at least one division metric derived from at least some components of said upper triangular matrix;
- dividing said upper triangular matrix into two or more sub-matrices using said set of division parameters in accordance with a division of said vector of information symbols into two or more sub-vectors, and determining at least one estimate of each sub-vector of information symbols by applying a symbol estimation algorithm, wherein the method further comprises determining at least one estimate of said vector of information symbols from the estimates of said sub-vectors of information symbols.

* * * * *